Figure 5:
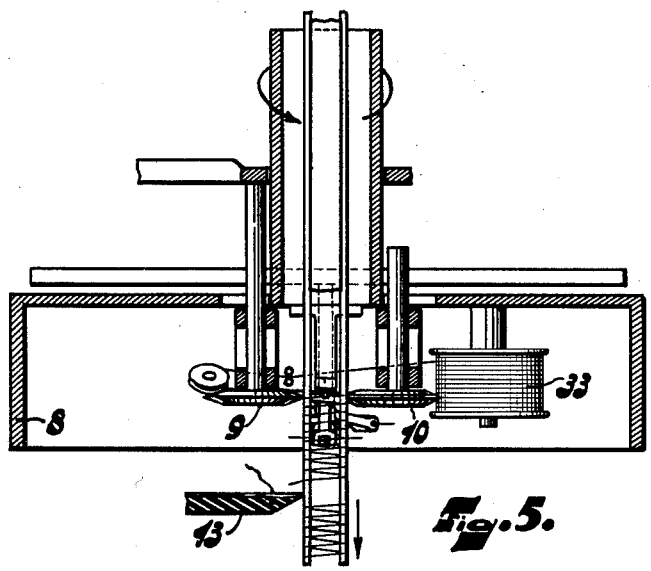

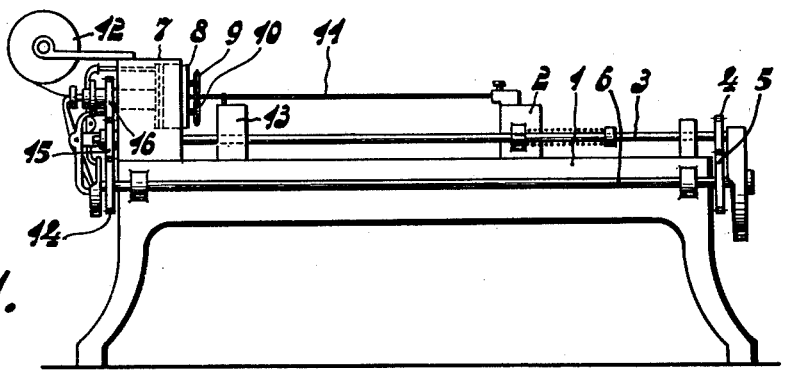

INVENTOR.
WILHELMUS BEX
GERRIT STARRE
BY Frank R. Trifari
AGENT

United States Patent Office 3,102,560
Patented Sept. 3, 1963

3,102,560
METHOD OF MANUFACTURING GRIDS FOR USE IN ELECTRIC DISCHARGE TUBES
Wilhelmus Bex and Gerrit Starre, Eindhoven, Netherlands, assignors, by mesne assignments, to North American Philips Company, Inc., New York, N.Y., a corporation of Delaware
Filed Nov. 10, 1953, Ser. No. 391,278
Claims priority, application Netherlands Nov. 10, 1952
5 Claims. (Cl. 140—71.5)

The invention relates to a method of manufacturing grids for use in electric discharge tubes. The grids comprise at least two grid backbones and a wire wound about them, the wire being introduced into grooves in the backbones and secured therein. The aforesaid plurality of grids are wound on common grid backbones and then separated from one another.

It is known to wind a plurality of successive grids on two grid backbones. In this known method the grid backbones are drawn along with a greater speed after a grid has been wound than during the winding of a grid, the wire being wound about the backbones during the intermediate period so that the grid wire between two grids is wound with greater pitch about the backbones than in the grid itself. This known method has a limitation in that the wire between two grids is not utilized effectively. Since this wire which may have a thickness of 40μ is comparatively costly, the loss due to the wire portions between the grids is comparatively great. The invention has for one of its objects to provide a method in which loss of wire does not occur or occurs to a considerably smaller extent than in the grid-winding machines hitherto known.

The method according to the invention has another feature that after a grid has been wound for the desired length the supply of wire to the backbones ceases so that the wire breaks off. After this breaking-off the end of the wire is secured to the backbone at a certain distance from the first grid and a new grid is wound. Consequently, in this method the wire between two successive grids is absent.

In one embodiment of the invention, the wire is secured into a groove of the backbone immediately after the introduction of said wire into said groove.

In a further embodiment of the present invention the portion of the wire extending beyond the fastening area of the wire to the grid backbone is burned off.

The device for carrying out one of the aforesaid methods comprises one or more supply coils for the grid backbones which are slidable in common along a mandril in their direction of length and a supply coil for the wire which is fed through a wire guide to the grid backbones, the wire guide rotating relatively to the grid backbones and has the feature that provision is made of a mechanism by means of which the wire supply stops each time after one grid has been wound.

In a further embodiment of the invention the wire guide rotates about the grid backbones.

In a further embodiment of the invention the device comprises a cutting tool and a flanging tool for cutting and flanging down grooves in the grid backbones respectively. It is in general desirable that the line between the centre B and the tangential point of the cutting tool and a grid backbone and the line between the centre and the tangential point of the flanging tool and a grid backbone should be at an angle of less than 180° to one another, the means for guiding the wire to the backbones lying inside this angle. The cutting tool and the flanging tool may, in this case, be constituted by rollers or by knife-shaped elements.

In order that the invention may be readily carried in effect, it will now be described with reference to the accompanying drawing which shows diagrammatically one embodiment of the grid-winding machine according to the invention.

Figure 8:
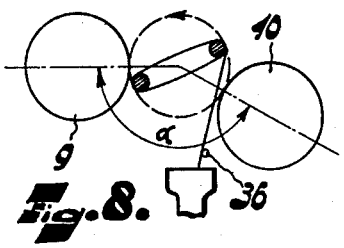
Figure 9:
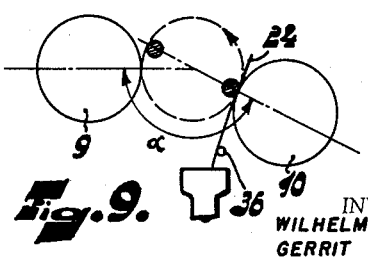

FIG. 1 shows the grid-winding machine and
FIG. 2 shows, on an enlarged scale, grid backbones having a grid manufactured by means of the winding machine according to the invention before one of the wire ends has been burned off and
FIG. 3 shows grid backbones, at which the wire ends of the grids have been removed.
FIGS. 4, 5, 6 and 7 are a few sectional views of the winding head of the machine on an enlarged scale.
FIGS. 8 and 9 show two different positions of the cutting tool and the flanging tool relative to the grid backbones.

Referring to FIG. 1, reference numeral 1 designates the bed of the grid-winding machine, along which the sledge 2 to which the ends of the grid backbones are secured is displaceable. For this purpose the structure is provided with a wire rod 3, which is rotated by means of a set of gear wheels 4 and 5, which may, if desired, be replaced by others. Thus the sledge 2 is moved with the desired speed along the bed of the grid-winding machine. The gear wheel 5 is seated on the shaft 6, the number of revolutions of which is derived from the stationary head 7. This stationary head comprises a rotatable housing 8 in which are arranged the tools for introducing and securing the wire into and to the grid backbones respectively. This housing comprises a cutting tool 9 and a flanging tool 10, the operations of which will be explained more fully with reference to FIGS. 4, 5, 6, 8 and 9. The housing 8 rotates about the grid backbones 11, which move only owing to the motion of the sledge 2 in the direction of length of the machine, but which do not perform a rotary movement. During the displacement, the grid backbones are wound off a supply coil 12.

The machine comprises, moreover, a burning-off device 13, the operation of which will be explained hereinafter. The structure of the machine is furthermore provided with a plurality of gear wheels 14, 15 and 16, by means of which the shaft 6 and the housing 8 are rotated from a prime mover (not shown). On this side are furthermore provided a plurality of lug discs and tumblers by means of which various tools which will be described hereinafter are governed.

FIG. 2 shows a grid obtained by the method according to the invention with the use of the device according to the invention before the end of the wire has been burned off. The grid backbones 20 and 21 are provided with grooves 22 by the roller 9. The wire 23 is wound in these grooves, after which the grooves containing the wire are closed by flanging by means of the flanging roller 10. In the devices hitherto known the sledge comprising the grid backbones is moved more rapidly after a grid has been wound while the winding operation is continued so that between two grids the pitch of the wound wire is materially greater. Afterwards this intermediate portion must be removed.

According to the invention the wire is broken off as soon as the grid has attained the desired length. For manufacturing a grid the end of the wire is secured again to the grid backbones so that loss of wire is avoided. When the grid wire is secured to the grid backbones, a portion of this wire extends beyond the backbone, as is shown in FIG. 2. This end 24 is then burned so that grids as shown in FIG. 3 are obtained.

Figure 6:
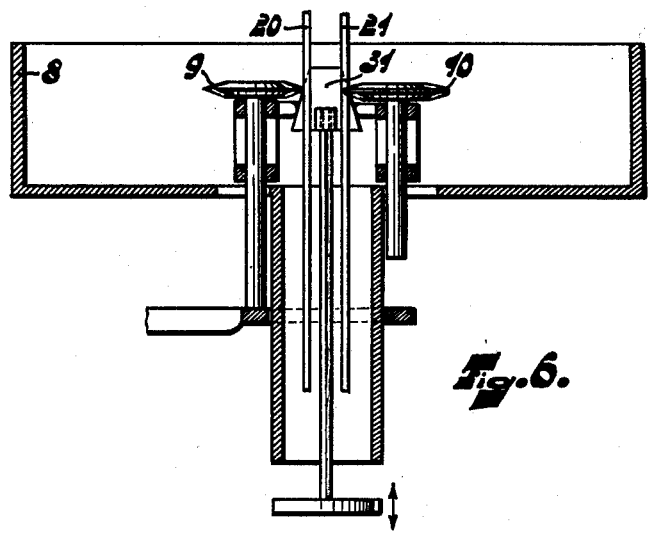

FIGS. 4, 5 and 6 show the tools for carrying out the method described above on an enlarged scale.

In the housing 8 the cutting tool 9 is constructed in the form of a cutting roller and a flanging tool 10 in the form of a flanging roller. The cutting roller 9 is seated on an arm 25, which is adapted to rotate about the point 26 of the housing 8. Similarly the flanging roller 10 is seated on an arm 27, which is also adapted to rotate about the point 26. The two rollers are drawn to one another by the spring 28 and the two arms are provided with stops 29 and 30 between which provision is made of a key 31 with the aid of which the arms 25 and 27 are moved from one another by axial displacement, the rollers 9 and 10 being lifted from the grid backbones. The key 31, shown in FIG. 7 is movable in an axial direction by means of a lug disc and a lever, provided on the front side of the machine. The two rollers are not positioned diametrically opposite one another, but the lines from the point 32, about which the housing 8 rotates, to the tangential points of the cutting roller and the flanging roller with a grid backbone are at an obtuse angle to one another, as is shown in FIGS. 8 and 9 on an enlarged scale.

The housing 8 is, furthermore, provided with a supply coil 33 for the wire 34. This wire moves over a roller 35 along a stud 36 of an arm 37. The wire moves between the arm 37 and the lever 38, which is adapted to rotate about a fixpoint 39 and is moved by the displacement of the point 40. This displacement may also be produced by means of a lug and a tumbling lever on the front side of the machine. The angle x in which the stud 36 is located is smaller than 180°.

The device comprises, moreover, the burning-off device 13, to which electric current is supplied periodically.

The device operates as follows: While the housing 8 rotates with the tools contained therein, the cutting roller 9 and the flanging roller 10 engage the grid backbones 20 and 21 for a certain period. The cutting roller cuts a groove in each of the grid backbones, the grooves in each backbone being spaced apart from one another by a distance varying with the displacement of the grid backbones. Simultaneously the wire 34 is wound on the grid, after which each groove is closed by flanging by the flanging roller 10. The wire is wound off the supply coil 33. When the grid has attained the desired length, the lever 38 rotates about the point 39 in a manner such that the wire is clamped tight between the lever 37 and the lever 38. This operation is controlled by means of a lug and a tumbling lever on the front side of the machine. Owing to the clamping of the wire, it breaks off, the breakage taking place at the fastening area of the wire to the grid backbone. Substantially simultaneously the key 31 is moved in an axial direction in a manner such that the rollers 9 and 10 are lifted from the grid backbones. At the same time the grid backbones may if desired be displaced more rapidly. The wire breaks off at a position of the rollers relative to the grid backbones as is shown in FIG. 8. It is assumed in this case for the sake of simplicity that the rollers are stationary while the grid backbones rotate. However, in reality, the rollers rotate and the grid backbones are stationary. When the rollers 9 and 10 are lifted from the grid backbones, the latter are displaced more rapidly by means of the sledge 2, the end 24 of the grid wire being adapted to move over the grid backbones without being wound thereon since the end is not secured in a groove by flanging. After the grid backbones have been displaced over a desired distance so that the distance between two successive grids is sufficiently large, the rollers 9 and 10 are again moved to engage the grid backbones by the displacement of the key 31, after which grooves are again cut and closed by flanging. In the positions of the grid backbones relative to the rollers shown in FIG. 9 the end 24 of the wire is grasped by the flanging roller and secured to the grid backbone so that the wire is rewound about the grid backbone. After a grid of the desired length has been wound the wire is again broken off and the backbones are again moved more rapidly over a certain distance. During this operation the end 24 of the grid passes by the burning-off device 13 to which electric current is supplied at this instant so that the end 24 of the wire is burned off. It is of importance that the cutting tool and the flanging tool should not be simultaneously in contact with a grid backbone.

While we have shown and described the preferred embodiment of our invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. A device for automatically manufacturing a plurality of separate grids on common grid backbones comprising at least one supply coil, at least two parallel, spaced grid backbones, means for winding the wire of said coil about said grid backbones including a wire guide which rotates relatively to said grid backbones and feeds wire from said supply coil to said grid backbones, said wire guide including an arm, a lever adapted to rotate about a fixed point to periodically clamp said wire against said arm and break off the supply of wire to said grid, and means securing the free end of the wire to said grid backbones at a distance spaced from the previous grid.

2. A device as set forth in claim 1 wherein said wire guide rotates about said grid backbones.

3. A device as set forth in claim 1 further comprising means for burning off the free ends of the wire of said supply coil on said grid backbones after said wire has been wound thereon.

4. A device for automatically manufacturing a plurality of separate grids on common grid backbones comprising at least one supply coil, at least two parallel, spaced grid backbones, means for winding the wire of said coil about said grid backbones including a wire guide which rotates relatively to said grid backbones and feeds wire from said supply coil to said grid backbones, said wire guide including an arm, a lever adapted to rotate about a fixed point to periodically clamp said wire against said arm and break off the supply of wire to said grid, and means for securing the free end of the wire to said grid backbones at a distance spaced from the previous grid, a cutting tool for cutting grooves, a flanging tool for closing said grooves by flanging after said wire has been inserted therein, said cutting tool and said flanging tool being adapted to rotate about said grid backbones and relative to the center of rotation about said grid backbones, the line between said center of rotation and the tangential point of said cutting tool and a grid backbone and the line between said center of rotation and the tangential point of said flanging tool and a grid backbone are at an angle of less than 180°, and said wire guide being located inside said angle, means for moving both said cutting tool and said flanging tool in a direction away from said grid backbones upon the breaking-off of said wire.

5. A device for automatically manufacturing a plurality of separate grids on common grid backbones for use in electric discharge tubes comprising at least one supply coil, at least two parallel, spaced grid backbones, means for winding the wire of said coil about and on said grid backbones, means for stopping the winding of said wire on said grid backbones, means for severing said wire after a predetermined length of wire has been wound on said grid backbones, and means for connecting said wire again to said grid backbones at spaced intervals thereof in order to wind another grid on said backbones.

References Cited in the file of this patent

UNITED STATES PATENTS

| | | |
|---|---|---|
| 1,970,599 | Franke | Aug. 21, 1934 |
| 1,994,307 | Flaws | Mar. 12, 1935 |
| 2,181,288 | Washburn | Nov. 28, 1939 |
| 2,188,906 | Lackey | Feb. 6, 1940 |
| 2,422,827 | Dreischman | June 24, 1947 |
| 2,441,228 | Schneider | May 11, 1948 |
| 2,633,159 | Shower | Mar. 31, 1953 |
| 2,654,401 | Legendre | Mar. 31, 1953 |
| 2,666,120 | Chanowitz | Jan. 12, 1954 |
| 2,717,092 | Gartner | Sept. 6, 1955 |
| 2,719,543 | Maurer | Oct. 4, 1955 |
| 2,725,901 | Engel | Dec. 6, 1955 |
| 2,759,499 | Gartner | Aug. 21, 1956 |